(12) United States Patent
Müller-Dauch et al.

(10) Patent No.: US 9,010,685 B2
(45) Date of Patent: Apr. 21, 2015

(54) GUIDING MECHANISM FOR OPENING AND CLOSING A CARGO DOOR OF AN AIRCRAFT, AIRCRAFT WITH SUCH A GUIDING MECHANISM AND METHOD FOR OPENING AND CLOSING A CARGO DOOR OF AN AIRCRAFT

(71) Applicant: Airbus Operations GmbH, Hamburg (DE)

(72) Inventors: Andreas Müller-Dauch, Bremen (DE); Matias Mail, Syke (DE)

(73) Assignee: Airbus Operations GmbH, Hamburg (DE)

( * ) Notice: Subject to any disclaimer, the term of this patent is extended or adjusted under 35 U.S.C. 154(b) by 41 days.

(21) Appl. No.: 13/655,119

(22) Filed: Oct. 18, 2012

(65) Prior Publication Data

US 2013/0284855 A1 Oct. 31, 2013

Related U.S. Application Data

(60) Provisional application No. 61/548,286, filed on Oct. 18, 2011.

(30) Foreign Application Priority Data

Oct. 18, 2011 (DE) .......................... 10 2011 116 326

(51) Int. Cl.
| | | |
|---|---|---|
| *B64C 1/20* | (2006.01) |
| *B64C 1/22* | (2006.01) |
| *B64D 47/00* | (2006.01) |
| *B64C 1/14* | (2006.01) |
| *E05D 13/00* | (2006.01) |
| *E06B 3/32* | (2006.01) |

(52) U.S. Cl.
CPC .............. *B64C 1/1415* (2013.01); *E05D 13/00* (2013.01); *E06B 3/32* (2013.01)

(58) Field of Classification Search
CPC ...................................................... B64C 1/1415
USPC .................................. 244/118.3, 129.5, 137.1
See application file for complete search history.

(56) References Cited

U.S. PATENT DOCUMENTS 2,405,878 A * 8/1946 Elwert ........................ 244/118.3
2,425,498 A * 8/1947 Watter ........................ 244/118.3
2,425,499 A * 8/1947 Watter ........................ 244/118.3

(Continued)

FOREIGN PATENT DOCUMENTS

DE 10 2005 057 914 1/2007

OTHER PUBLICATIONS

German Office Action for Application No. 10 2011 116 326.7 dated Jun. 25, 2013.

*Primary Examiner* — Philip J Bonzell
(74) *Attorney, Agent, or Firm* — Jenkins, Wilson, Taylor & Hunt, P.A.

(57) ABSTRACT

A guiding mechanism is disclosed for moving a cargo door into extended cargo door positions to open and into a retracted cargo door position to close at least one section of an opening of a loading hatch on a fuselage of an aircraft. A first structural component in the form of the cargo door is pivotably supported on a second structural component on a front lateral edge by a pivot joint arranged in a pivoting axis in order to assume the extended cargo door positions on the loading hatch. The guiding mechanism features at least one actuator for moving the cargo door, a supporting device arranged on an actuating element, and a spring mechanism on the actuator for exerting a compressive force.

13 Claims, 5 Drawing Sheets

(56) References Cited

U.S. PATENT DOCUMENTS

| | | | | |
|---|---|---|---|---|
| 2,425,972 A | * | 8/1947 | Watter | 244/118.3 |
| 2,432,055 A | * | 12/1947 | Watter et al. | 244/118.3 |
| 2,942,812 A | * | 6/1960 | Pauli | 244/118.3 |
| 3,128,068 A | * | 4/1964 | Pauli | 244/129.5 |
| 3,836,101 A | * | 9/1974 | Mattia et al. | 244/137.1 |
| 4,498,648 A | * | 2/1985 | DeLuca et al. | 244/118.3 |
| 5,253,381 A | * | 10/1993 | Rawdon et al. | 14/71.5 |
| 8,215,581 B1 | * | 7/2012 | Kulesha | 244/118.3 |
| 2010/0180432 A1 | * | 7/2010 | Payne et al. | 29/709 |

* cited by examiner

Fig. 7a　　　　　　　　Fig. 7b ns that feature: an actuator drive unit with a connecting device for supporting the actuator drive unit on the first or second structural component and an actuating element that can be moved relative to the actuator drive unit and is coupled to a second connecting device on the respectively other structural component, wherein the drive unit can actuate said actuating element into adjusting states between a first actuating state that corresponds to the retracted position of the cargo door and a second actuating state that corresponds to the maximally extended position of the cargo door,

GUIDING MECHANISM FOR OPENING AND CLOSING A CARGO DOOR OF AN AIRCRAFT, AIRCRAFT WITH SUCH A GUIDING MECHANISM AND METHOD FOR OPENING AND CLOSING A CARGO DOOR OF AN AIRCRAFT

CROSS-REFERENCE TO RELATED APPLICATIONS

This application claims the benefit of and priority to German Patent Application No. DE 10 2011 116 326.7 and U.S. Provisional Patent Application No. 61/548,286 both filed on Oct. 18, 2011, the entire disclosures of which are hereby incorporated herein by reference.

TECHNICAL FIELD

The invention pertains to a guiding mechanism for opening and closing a cargo door of an aircraft, an aircraft with such a guiding mechanism and a method for opening and closing a cargo door of an aircraft.

BACKGROUND

On certain aircraft known from the general prior art, a cargo loading hatch and a cargo door are arranged on the underside of the aircraft tail section.

SUMMARY

It is the objective of the invention to make available a guiding mechanism for opening and closing a cargo door of an aircraft, an aircraft with such a guiding mechanism and a method for opening and closing a cargo door of an aircraft, by means of which a more reliable and generally stable positioning of the cargo door can be respectively achieved and the structural stresses in the aircraft fuselage caused by the cargo door are maintained relatively low.

This objective is attained with the characteristic of the independent claims. Other embodiments are disclosed in the claims that respectively refer to these independent claims.

According to an aspect of the invention, a guiding mechanism for moving a cargo door into extended cargo door positions in order to open at least one section of an opening of a loading hatch on a fuselage of an aircraft and into a retracted cargo door position in order to close the at least one section of the opening of the loading hatch is proposed, wherein a first structural component in the form of the cargo door is pivotably supported on a second structural component of the aircraft in the form of the fuselage by means of a pivot joint in order to move the cargo door, and wherein the guiding mechanism features:

at least one actuator for moving the cargo door between a retracted position and a maximally extended cargo door position that features: an actuator drive unit with a connecting device for supporting the actuator drive unit on the first or second structural component and an actuating element that can be moved relative to the actuator drive unit and is coupled to a second connecting device on the respectively other structural component, wherein the drive unit can actuate said actuating element into adjusting states between a first actuating state that corresponds to the retracted position of the cargo door and a second actuating state that corresponds to the maximally extended position of the cargo door, a connecting element that is movably coupled to the drive unit and/or the actuating element and features a supporting device for supporting the connecting element on the first or second connecting device such that a compensation travel between the actuating element and the connecting element is available at an outer limit of the extended cargo door positions relative to the respective actuating states of the actuating element, and a spring mechanism that is arranged on the actuator and designed for exerting a compressive force between the first and the second connecting device and for supporting the cargo door relative to the outer limit of a respective extended cargo door position.

In the embodiment of the inventive guiding mechanism, in which a connecting element is movably coupled to the drive unit and to the actuating element, a connecting element that, in particular, may be coupled to the respective connecting device such that it is movable relative thereto is respectively arranged on the first or second structural component or on the first or second connecting device. It therefore would be generally possible, in particular, to arrange a spring mechanism between the connecting element coupled to the first connecting device of the first structural component and the drive unit and/or between the to the second connecting device of the second structural component and the actuating element.

According to an embodiment of the inventive guiding mechanism, it is proposed to arrange the actuating element on a connecting element such that it is movable relative thereto, wherein the spring mechanism is arranged between the connecting element and the actuating element and realized in such a way that the compensation travel at the outer limit of the extended cargo door positions is realized in the form of a movement of the connecting element relative to the actuating element, during which the spring mechanism exerts a compressive force.

According to another embodiment of the inventive guiding mechanism, it is proposed that at least one actuator features:
a connecting element that is movable relative to the actuator drive unit and, viewed from the actuator drive unit, is situated on the side of the actuator that lies opposite of the side, on which the actuating element with the spring mechanism is located, and
a damping device that is integrated between the connecting element and the actuator drive unit in order to dampen movements between the second connecting element and the actuator drive unit.

According to another embodiment of the inventive guiding mechanism, the guiding mechanism features: a cargo door bracing device with at least one cargo door brace that can be coupled to a first coupling device on the loading hatch on the one hand and to a second coupling device on the cargo door on the other hand and makes available at least one maximal length of the distance between the coupling devices in order to limit a respective extended position of the cargo door.

In this case, it would be possible, in particular, that the cargo door bracing device is situated behind the at least one actuator viewed in the longitudinal direction of the cargo door from the pivoting axis thereof.

According to another embodiment of the inventive guiding mechanism, it is proposed that the spring mechanism features a coil spring and/or a pneumatic spring.

According to another embodiment of the inventive guiding mechanism, it is proposed to realize the spring mechanism in such a way that the spring force thereof is adjustable.

According to another embodiment of the inventive guiding mechanism, it is proposed that the actuator consists of a hydraulic actuator.

According to another aspect of the invention, the following is proposed: an aircraft with a fuselage, a loading hatch, a cargo door and a guiding mechanism for moving the cargo door into extended cargo door positions in order to open at least one section of an opening of a loading hatch on a fuselage of an aircraft and into a retracted cargo door position in order to close the at least one section of the opening of the loading hatch, wherein a first structural component in the form of the cargo door is pivotably supported on a second structural component of the aircraft in the form of the fuselage by means of a pivot joint in order to move the cargo door, and wherein the guiding mechanism features:

at least one actuator for moving the cargo door between a retracted position and a maximally extended cargo door position that features: an actuator drive unit with a connecting device for supporting the actuator drive unit on the first or second structural component and an actuating element that can be moved relative to the actuator drive unit and is coupled to a second connecting device on the respectively other structural component, wherein the drive unit can actuate said actuating element into adjusting states between a first actuating state that corresponds to the retracted position of the cargo door and a second actuating state that corresponds to the maximally extended position of the cargo door, a connecting element that is movably coupled to the drive unit or the actuating element and features a supporting device for supporting the connecting element on the first or second connecting device such that a compensation travel between the actuating element and the connecting element is available at an outer limit of the extended cargo door positions relative to the respective actuating states of the actuating element, and a spring mechanism that is arranged on the actuator and designed for exerting a compressive force between the first and the second connecting device and for supporting the cargo door relative to the outer limit of a respective extended cargo door position.

According to another embodiment of the inventive aircraft, it is proposed that the first connecting device is realized on the loading hatch and the second connecting device is realized on the cargo door.

According to another embodiment of the inventive aircraft, it is proposed that the guiding mechanism features: a cargo door bracing device with at least one cargo door brace that can be coupled to a first coupling device on the loading hatch on the one hand and to a second coupling device on the cargo door on the other hand and makes available at least one maximal length of the distance between the coupling devices in order to limit a respective extended position of the cargo door.

According to another aspect of the invention, a method for moving a cargo door that is pivotably supported on a fuselage of an aircraft into extended cargo door positions in order to open at least one section of an opening of a loading hatch on a fuselage of an aircraft and into a retracted cargo door position in order to close the at least one section of the opening of the loading hatch is proposed, wherein a first structural component in the form of the cargo door is pivotably supported on a second structural component of the aircraft in the form of the fuselage by means of a pivot joint arranged in the pivoting axis in order to assume the extended cargo door positions, and wherein the method features the following steps:

actuating an actuating element of an actuator that is connected to the fuselage on the one hand and to the cargo door on the other hand in order to move the actuating element into an actuating state that corresponds to an extended position of the cargo door, the cargo door into a limiting position due to an outer limit of the movement thereof such that it assumes a lesser extended position, i.e., with a smaller opening of the loading hatch, than the extended position of the cargo door corresponding to the actuating state of the actuating element, wherein a spring mechanism arranged between the actuating element and a connecting element movably coupled thereto is simultaneously compressed such that the movement of the actuating element into the actuating state that lies beyond a position corresponding to the limiting position of the cargo door is compensated.

According to another embodiment of the inventive method, it is proposed that the limitation of the movement of the cargo door is realized by means of a cargo door bracing device with at least one cargo door brace that is coupled to a first coupling device on the loading hatch on the one hand and to a second coupling device on the cargo door on the other hand and makes available at least one maximal length of the distance between the coupling devices in order to limit the extended position of the cargo door.

According to an embodiment of the inventive method, it is alternatively proposed that the limitation of the extended position of the cargo door is realized by means of an area of the ground, on which the cargo door lies when the limitation of the movement of the cargo door occurs.

BRIEF DESCRIPTION OF THE DRAWINGS

In the following descriptions of the figures, the invention is elucidated in greater detail with reference to exemplary embodiments. In these figures:

FIGS. 7a and 7b show schematic details of an embodiment of the inventive actuator of the inventive actuating mechanism or guiding mechanism in different adjusting states, wherein FIG. 7a shows a relatively extended actuating state and FIG. 7b shows a relatively retracted actuating state of the actuator.

DETAILED DESCRIPTION

Figure 1:
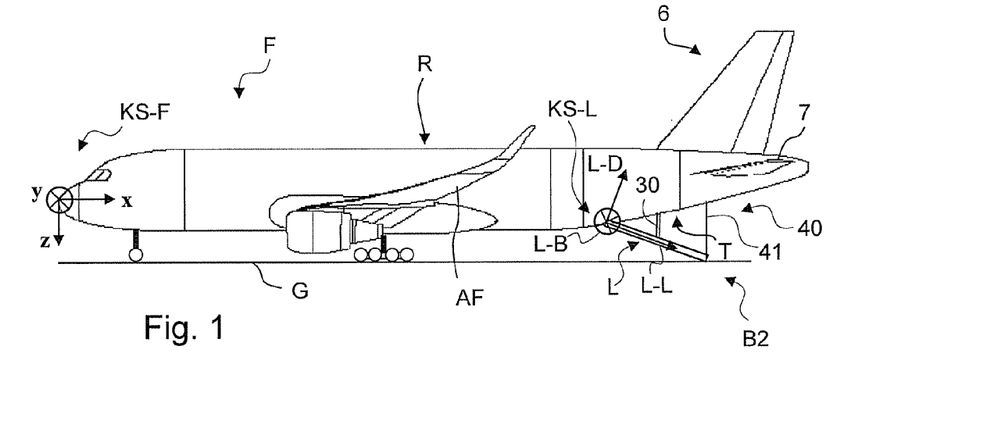
FIG. 1 shows a side view of an embodiment of the inventive aircraft with an actuating mechanism or guiding mechanism according to the invention, wherein the aircraft stands on the ground and a cargo door of the aircraft for opening and closing an opening of a loading hatch on the fuselage of the aircraft is schematically illustrated in an extended state.
Figure 2:
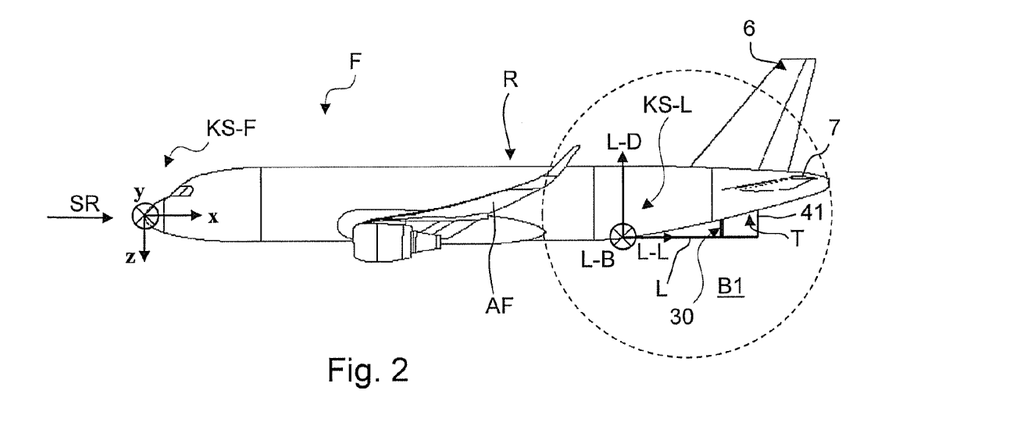
FIG. 2 shows a side view of the embodiment of the inventive aircraft according to FIG. 1 with an actuating mechanism or guiding mechanism according to the invention, wherein the aircraft assumes a flight attitude and a cargo door of the aircraft is schematically illustrated in an extended position, in which it opens the loading hatch and an airdrop can be carried out.

FIGS. 1 and 2 respectively show an aircraft F for implementing embodiments of the invention that features a fuselage R and two airfoils, of which only one is respectively illustrated in the side views according to FIGS. 1 and 2 and identified by the reference symbol AF. Both airfoils AF are illustrated in a rudimentary fashion in the figure and identified by the reference symbols AF. In FIGS. 1 and 2, an aircraft coordinate system KS-F that refers to the aircraft F is illustrated with a longitudinal aircraft axis X, a lateral aircraft axis Y and a vertical aircraft axis Z. The respective airfoils AF preferably feature a main wing and at least one aileron that is arranged thereon such that it is movable in two moving directions, as well as optionally at least one spoiler that is movably arranged thereon and optionally at least one trailing edge flap. The aircraft F features a rudder unit 6 with at least one rudder 6a and an elevator unit 7 with at least one respective elevator 7a. The elevator unit 7 may be realized, e.g., in the form of a T-shaped elevator unit or a cruciform elevator unit.

The aircraft F suitable for the implementation of the invention may also have a shape that differs from that of the aircraft F illustrated in FIG. 1 or 2 such that the invention can also be implemented in aircraft with a design that differs from that of the aircraft illustrated in FIG. 1 or 2, particularly in heavier and more stout airfreighters.

The cargo door L provided in accordance with the invention and, in particular, its center plane ME has a front lateral edge or a front lateral edge section B1 extending on the pivoting axis D on a first side of the cargo door L, a rear lateral edge or a rear lateral edge section B2 that is situated in the second side of the cargo door L that lies opposite of the first side, a first longitudinal edge or a first longitudinal edge section L1 and a second longitudinal edge or a second longitudinal edge section L2 that are respectively situated on opposite longitudinal sides of the cargo door L. The center plane ME refers to the generally curved surface that extends centrally viewed in the thickness direction L-D of the cargo door L and particularly the plane, in which the centroidal axes of the cargo door L are situated in the plane defined by L-D and L-Q.

In order to describe the invention and, in particular, the actuating mechanism or guiding mechanism provided therefor and the cargo door L, the following coordinate system is introduced in addition to the aircraft coordinate system KS-F: a cargo door coordinate system KS-L of the general loading hatch T in the form of a fixed coordinate system on the loading hatch T that has its origin on the pivoting axis and on the axial bisecting line S of the loading hatch T, as well as the longitudinal direction L-L extending in the direction of the axial bisecting line S of the cargo door L, the lateral direction L-Q extending in the direction of the pivoting axis D and the thickness direction L-D as the coordinate axis that extends perpendicular to the aforementioned directions. According to the coordinate system used herein, the axial bisecting line S extends in such a way that it centrally intersects the rear lateral edge B2. The axial bisecting line S may generally also consist of a straight reference line that defines a longitudinal direction of the cargo door L.

In this case, the flow direction SR or inflow direction of the fluid flowing against the aircraft F in the intended fashion is the direction, in which the aircraft with its given shape produces its intended fluid-dynamic effect and, in particular, a desired lift/drag ratio.

Figure 3:
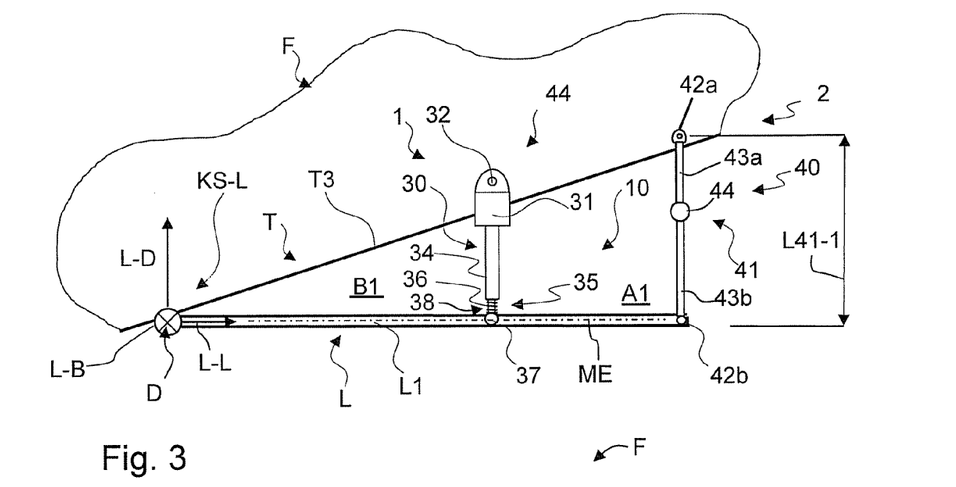
FIG. 3 shows a detail of a lateral section through the aircraft with the cargo door according to FIG. 1 or 2, in which the inventive actuating mechanism or guiding mechanism is illustrated in greater detail than in the illustration according to FIG. 2, wherein a cargo door of the aircraft is schematically illustrated in an extended position that it assumes in a flight attitude of the aircraft, and wherein the lateral section through the aircraft is based on a section in the plane defined by the longitudinal aircraft axis and the vertical aircraft axis.
Figure 4:
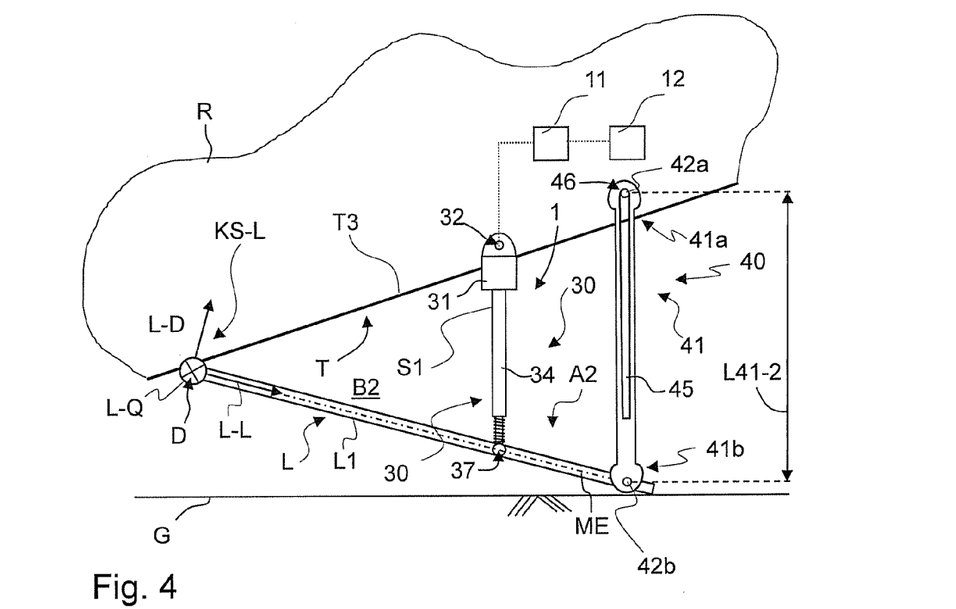
FIG. 4 shows a detail of a lateral section through the aircraft according to FIG. 4 with the cargo door according to FIG. 1, in which the inventive actuating mechanism or guiding mechanism is illustrated in greater detail than in the illustration according to FIG. 1, wherein the cargo door of the aircraft is schematically illustrated in an actual state that it assumes in an extended position when the aircraft stands on the ground.
Figure 5:
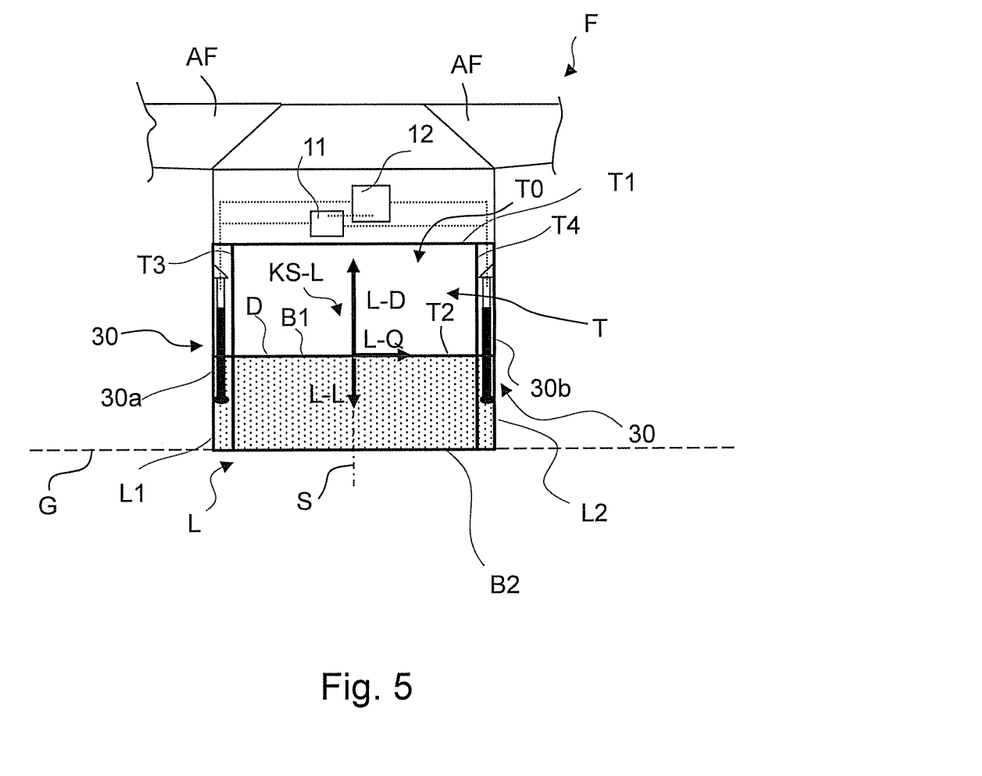
FIG. 5 shows a schematic representation of an aircraft with the inventive actuating mechanism or guiding mechanism on the tail of the aircraft viewed opposite to the longitudinal axis of the aircraft, wherein the cargo door is illustrated in a state that it assumes in an extended position when the aircraft stands on the ground, and wherein the cargo door lies on the ground with a rear end section.

FIGS. 3 and 4 show the aircraft F and the aircraft coordinate system KS-F, the airfoil AF on the port side and a cargo door L that is coupled in an articulated fashion to a loading hatch T by means of a pivot joint arrangement with the pivoting axis D. In FIG. 5, the cargo door L is illustrated with the lateral edges T1, T2, T3, T4. The loading hatch T consists of the frame of the fuselage structure of the aircraft that contains the loading hatch opening TO and is adjoined by the cargo door L with its corresponding edge sections when the cargo door L is in its closed state, i.e., when it does not assume an extended position.

In the illustrations of the aircraft F in FIGS. 1 and 3, the cargo door L is shown in a first extended position or operative position B1 that can be adjusted when the aircraft is on the ground G and in which the cargo door L lies on the ground G with its rear longitudinal edge. In this extended position B1, the cargo door L is oriented in such a way that its longitudinal direction L-L extends in the longitudinal direction X of the aircraft F. A cargo door brace 40 is furthermore indicated. FIG. 2 and FIG. 4 show the cargo door L in a second extended position or operative position B2 that can be adjusted, in particular, in-flight and is intended, in particular, for airdrops.

According to the invention, the aircraft F features an actuating mechanism 1 or guiding mechanism 2 for moving the cargo door L in order to open and close the loading hatch T on an aircraft F by means of a first structural component in the form of the cargo door L that is supported on a second structural component of the aircraft F in the form of the loading hatch T with a front lateral edge B1 by means of a pivot joint arranged in a pivoting axis D in order to assume extended positions A1, A2. The actuating mechanism 1 features at least one actuator 30 for moving the cargo door L between a retracted position and a maximally extended position B1, B2. The actuator 30 features: an actuator drive unit 31 with a first connecting device 32 for supporting the actuator drive unit on the first or second structural component and an actuating element 34 that can be moved relative to a driving element such as an actuator, e.g., in the form of an actuating cylinder of the actuator drive unit 31, as well as moved into commanded adjusting states between a first actuating state or initial state that corresponds to the retracted position of the cargo door L and a second actuating state that corresponds to an extended position of the cargo door L by means of a driving element of the actuator drive unit such as, e.g., a driving piston or a driving slider, wherein the extended position of the cargo door L may be a maximally extended position of the cargo door L.

The actuating element 34 is on the one hand coupled to the actuator drive unit 31 such that it is movable relative thereto. The actuator drive unit 31 may, in particular, consist of an actuating cylinder as schematically illustrated in FIGS. 3 and 4, and the actuating element 34 may consist, in particular, of an actuating piston with a piston rod that is guided in the actuating cylinder such that the actuating piston or the actuating element 34 can be moved relative to the actuating cylinder in a translatory fashion. According to another embodiment, the actuator drive unit 31 consists of a rotary actuator with a driving lever and the actuating element 34 consists of an actuating lever that is coupled to an end section of the driving lever such that the actuating element 34 is arranged pivotably relative to the driving lever or the driving element. The actuating element 34 is generally coupled to a second connecting device 37 on the respectively other structural component by means of a supporting device 34a realized thereon, e.g. a rocker bearing for preferably realizing an articulated support of the actuating element, such that the actuating element 34 can be actuated, in particular, into adjusting states between a first actuating state that corresponds to the retracted position of the cargo door L and a second actuating state that corresponds to the maximally extended position of the cargo door L.

It would be possible, in particular, to couple the actuating element 34 to the second connecting device 37 by means of a connecting element 36. A spring mechanism 38 situated between the connecting element 36 and the actuating element 34 or the actuator drive unit 31 is preferably arranged on the actuating element 34 and realized in such a way that it can transmit a compressive force from the respective actuating element 34 or actuator drive unit 31 to the second connecting device 37 when the spring mechanism 38 is compressed due to the connecting element 36 and the actuator drive unit 31 being moved toward one another, in particular, due to external forces. The connecting element 36 may, in particular, be arranged or positioned on the actuating element such that it is movable relative thereto. In this case, the connecting element 36 features a supporting device such as a rocker bearing for realizing the support thereof on a second connecting device 37 provided on one of the structural components. In this embodiment, in particular, the spring mechanism 38 is realized and arranged in such a way that it presses the connecting element 36 away from the actuating element 34 when the respectively other structural component does not exert a force upon the second connecting device 37. The actuating element 34 may be guided relative to the actuator drive unit 31 or the driving element by means of an actuating element guiding mechanism such as, e.g., by means of adjoining sliding surfaces on the actuator drive unit 31 or the driving element on the one hand and on the actuating element 34 on the other hand.

According to the invention, a guiding mechanism 2 for moving a cargo door L is also provided in order to open and close a loading hatch T on an aircraft F, wherein said guiding mechanism is composed of the actuating mechanism 1 and a cargo door bracing device 40. The cargo door bracing device 40 features at least one cargo door brace 41 that is coupled to a first coupling device 42a on the loading hatch T on the one hand and to a second coupling device 42b on the cargo door L on the other hand and makes available at least one maximal length L41-1, L41-2 in order to limit the extended position A1, A2 of the cargo door L. In this case, it would be possible to couple the at least one cargo door brace to the loading hatch and/or to the cargo door in such a way that this coupling can, in particular, be manually disengaged or not disengaged in-flight by the flight crew.

FIGS. 3 and 4 schematically show a cargo door bracing device 40 that engages on the free end of the cargo door L in the embodiment shown. The cargo door bracing device 40 may be composed of two cargo door braces that may be arranged, in particular, on the longitudinal sides L1, L2 of the cargo door L, wherein one respective cargo door brace is arranged on each longitudinal side L1, L2 of the cargo door L and, in particular, coupled thereto (not illustrated in the figures). The cargo door bracing device 40 is coupled to a first coupling device 42a on the loading hatch T on the one hand and to a second coupling device 42b on the cargo door L on the other hand and makes available the at least one maximal length (reference symbol L41-1, L41-2) of the distance between the coupling devices 42a, 42b in order to limit the extended position A1, A2 of the cargo door L.

FIGS. 1 to 4 show an embodiment of the guiding mechanism 2 that respectively features only one cargo door brace 41 that is coupled to a first coupling device 42a arranged on or in the region of a longitudinal edge T1 of the loading hatch T with a first end or a first section 41a and to a second coupling device 42b arranged on or in the region of a first longitudinal edge L1 of the cargo door L with a second end or a second section 41b. A second (not-shown) cargo door brace preferably forms part of the cargo door bracing device 40 and is coupled to the second longitudinal edge T2 of the loading hatch T that lies opposite of the first longitudinal edge T1 with a first end and to the cargo door L on or in the region of its second longitudinal edge L2 with a second end. In FIG. 5, no cargo door brace 41 or cargo door bracing device 40 is illustrated in order to simplify the illustration of the cargo door L. However, the inventive guiding mechanism may also be realized without a cargo door bracing device 40.

According to an embodiment of the inventive guiding mechanism with a cargo door bracing device 40, the first end 41a and the second end 41b of the respective cargo door brace 41 can be suspended on respective coupling devices 42a and 42b on the loading hatch T and on the cargo door L with a length L41-1 or L41-2 or with adjustable lengths. For this purpose, the respective cargo door brace 41 has a certain length that is suitable for adjusting the cargo door L into a first extended position or a first operative position A1 or into a second extended position or a second operative position A2 when the ends of the respective cargo door brace 41 are coupled to the respective coupling devices of the loading hatch T and the cargo door L with a first effective length or a second effective length. FIG. 3 shows a cargo door brace 41 with a first length L41-1, at which the cargo door L assumes a first extended position or first operative position A1 for in-flight airdrops, while FIG. 4 shows another cargo door brace 41 with a second length L41-2, at which the cargo door assumes a second extended position or a second operative position A2 for unloading and/or loading the aircraft F through the loading hatch T.

The at least one cargo door brace 41 may be realized in different ways in order to realize a predetermined length L41-1 or L41-2. In the embodiment of the actuating mechanism 1 and the guiding mechanism 2 according to FIG. 3, the corresponding cargo door brace 41 is composed of a first brace section 43a and a second brace section 43b that are coupled to the coupling devices 42a, 42b with their first ends and coupled to one another, in particular, by means of an axial pivot joint 44. In FIG. 3, the length of this embodiment of the cargo door brace 41 is identified by the reference symbol L41-1. The pivot joint 44 is realized in such a way that the brace sections 43a, 43b collapse in the state illustrated in FIG. 3 when the loading hatch T is retracted due to a corresponding activation of the actuator 30. When the actuator 30 is activated such that the cargo door L is extended, the cargo door brace 41 has the function of limiting the travel of the cargo door L during the extension thereof.

The embodiment of the cargo door brace 41 illustrated in FIG. 4 is coupled to a first coupling device 42a arranged on or in the region of a longitudinal edge T1 of the loading hatch T with a first end or a first section 41a and to a second coupling device 42b on or in the region of a first longitudinal edge L1 of the cargo door L with a second end or a second section 41b. The cargo door brace 41 is preferably realized in one piece and features an oblong hole 45, into which a guide pin 46 that may form part of the coupling device 42a engages. In this way, the respective currently effective length of the cargo door brace can be varied up to a total length L41-2 in this embodiment of the cargo door brace 41. In this way, the cargo door brace 41 acts as a limiter or limiting brace for the extended position of the cargo door L.

It would alternatively be possible to realize the respective cargo door brace 41 used in such a way that its length is adjustable (not illustrated in the figures) such it can be adjusted, e.g., to a first length L41-1, at which the cargo door L assumes a first extended position A1 (FIG. 3) in the coupled state of the cargo door brace 41, and to a second length L41-2, at which the cargo door L assumes a second extended position A2 (FIG. 4) in the coupled state of the cargo door brace 41.

In the embodiment of the inventive guiding mechanism 2 illustrated in FIG. 3, the length L41-1 of the cargo door brace 41 in its maximally opened state is realized such that the longitudinal direction L-L or longitudinal extent of the cargo door L or the axis of symmetry S essentially extends along the longitudinal axis X of the aircraft F and preferably in a range between ±15 degrees relative to the longitudinal axis X of the aircraft F. This applies, in particular, to an embodiment of the cargo door L that is intended, in particular, for in-flight cargo airdrops from the aircraft through the cargo door L. For cargo airdrops, the loading hatch brace 41 generally may also have a length that differs from the length L41-1 illustrated in FIG. 3.

In the embodiment of the guiding mechanism 2 illustrated in FIG. 4, this guiding mechanism has a length L41-2 that limits the position of the cargo door to an extended position, in which the rear lateral edge B2 of the cargo door L reaches to the ground G and is spaced apart therefrom or lies thereon when the aircraft F stands on the ground.

The cargo door bracing device 40 and, in particular, the cargo door brace 41 generally has the function of limiting the length or the distance between the coupling devices 42a, 42b, to which opposite end sections of the cargo door brace 41 are coupled.

The cargo door bracing device 40 may generally also be situated in front of the actuator 30 or the actuators 30a, 30b viewed in the longitudinal direction L-L from the pivoting axis D.

A sensor device 11 and a control unit 12 of an embodiment of the inventive aircraft F are also schematically illustrated in FIG. 4. The sensor device 11 is provided for determining the position and, in particular, an extended position of the cargo door L and for this purpose preferably arranged on or in the respective actuator 30 or 30a, 30b or on the cargo door L, particularly on the pivot joint, by means of which the cargo door is coupled to the loading hatch T. The sensor device 11 is functionally connected to the control unit 12 and to the respective actuator 30 or actuators 30a, 30b. The control unit 12 is realized in such a way that it a corresponding actuating command for the respective actuator 30 or actuators 30a, 30b, in particular, based on an input signal for varying the adjusting position of the cargo door L and transmits this actuating command to the respective actuator 30 or actuators 30a, 30b for the activation thereof. The energy supply of the respective actuator 30 or actuators 30a, 30b may, in principle, be realized hydraulically and/or electrically such that this actuator or these actuators respectively is or are connected to a corresponding hydraulic system of the aircraft and/or electrical system of the aircraft. In this embodiment, the control unit 12 receives information on the current adjusting position of the cargo door L from the sensor device 11. The control unit 12 preferably has an actuating function that stops the activation of the respective actuator 30 or actuators 30a, 30b once it/they or the cargo door L has/have reached the extended position or adjusting position specified by the control unit 12, i.e., a nominal position. The actuating function may also be realized in such a way that it corrects the current extended position if a deviation occurs between the actual position detected by the sensor device 11 and the respectively commanded nominal adjusting position of the cargo door L.

FIG. 5 shows the opened cargo door L in a second extended position or operative position A2 on the ground in the form of a rear view of the aircraft F. Consequently, the loading hatch T that is exposed due to the opened cargo door L is also visible in this figure. The main wings AF are indicated in a highly schematic fashion on the aircraft illustrated in FIG. 5. The cargo door bracing device 40 coupled between the loading hatch and the cargo door L in accordance with an inventive embodiment of the guiding mechanism 2 is not illustrated in FIG. 5. According to the invention, the cargo door bracing device 40 may also be omitted. Two actuators 30a, 30b are provided in the embodiment of the actuating mechanism 1 illustrated in FIG. 5.

Figure 6A:
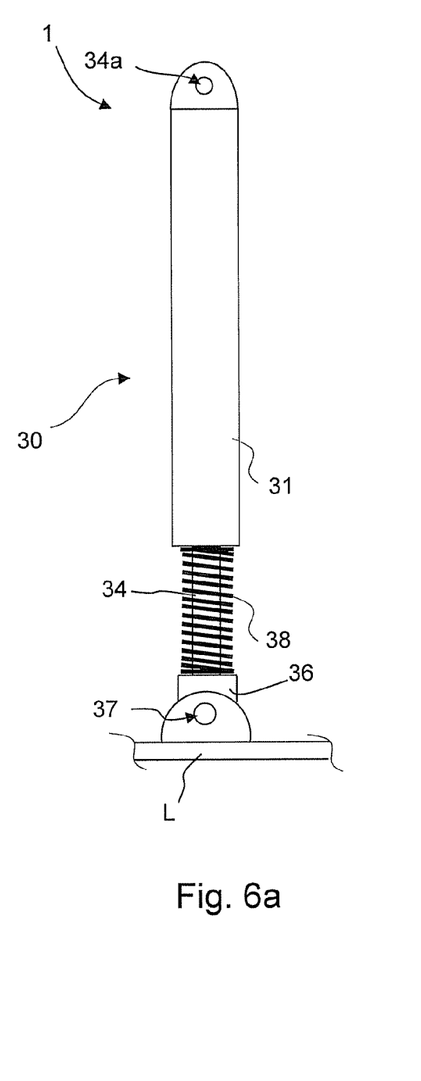
FIG. 6a shows a schematic detail of an embodiment of the inventive actuating mechanism in a state that it assumes in an extended adjusting state of the cargo door, wherein the actuating mechanism comprises a spring mechanism.

The respective actuator 30 or 30a, 30b provided in accordance with the invention may be realized in different ways. FIG. 6a shows an embodiment of the actuator 30 with a spring mechanism 38, wherein the actuator 30 does not feature a damping device. The connecting element 36 and the actuating element 34 are jointly guided by means of an actuating element guiding device on the drive unit 31 or the driving element in such a way that the connecting element 36 can be moved relative to the actuating element 34. The spring mechanism 38 is realized in such a way that it presses the actuating element 34 away from the connecting element 36. According to the embodiment shown, the spring mechanism 38 may be realized in the form of a coil spring or in a different way, particularly in the form of a pneumatic spring. The actuating mechanism 1 may also be installed into the aircraft F in such a way that the connecting element 36 of the actuator 30, on which the spring mechanism 38 is situated, is connected to the first connecting device 32.

Figure 6B:
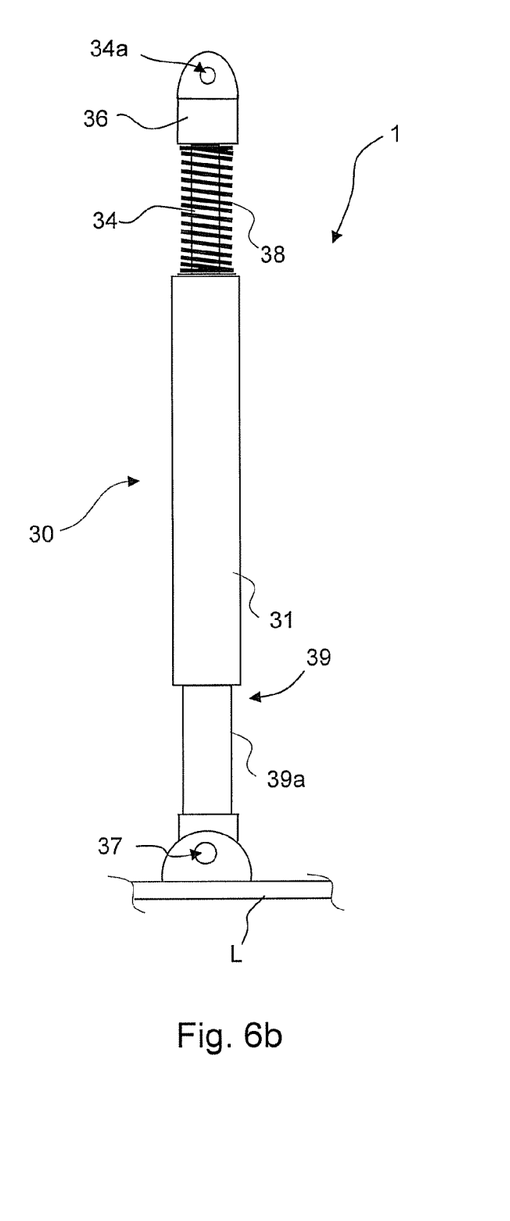
FIG. 6b shows a schematic detail of an embodiment of the inventive actuating mechanism or guiding mechanism in a state that it assumes in an extended adjusting state of the cargo door, wherein the actuating mechanism features a spring mechanism, as well as a damping device.

The actuator 30 may optionally feature an additional damping device 39. In contrast to the embodiment of the actuator 30 illustrated in FIG. 6a, such an embodiment of the actuator 30 is illustrated in FIG. 6b such that the actuator 30 shown features a spring mechanism 38, as well as a damping device 39. In this case, the actuator 30 may feature, in particular, an additional or second connecting element 39a that can be connected to the respective connecting device (namely the second connecting device 37 in the embodiment according to FIG. 6b) and moved relative to the actuator drive unit 31, i.e., a driving element such as, e.g., an actuating cylinder or a driving arm thereof, by means of a connecting element guiding mechanism such as, e.g., adjoining sliding surfaces on the actuator drive unit 31 on the one hand and on the second connecting element 39a on the other hand or a pivot bearing, wherein a damping device 39 is arranged and effectively integrated between the second connecting element 39a and the actuator drive unit 31 in such a way that movements between the second connecting element 39a and the actuator drive unit 31 can be dampened. According to an embodiment of the actuator 30 that is illustrated in FIG. 6b, the second connecting element 39a is, viewed from the actuator drive unit 31, situated on the side of the actuator 30 that lies opposite of the side, on which the first connecting element 36 is located.

Figure 7A:
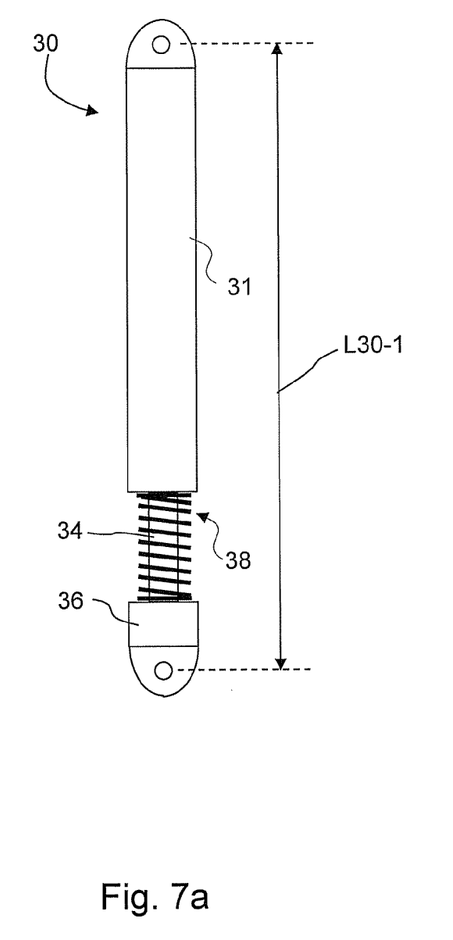
Figure 7B:
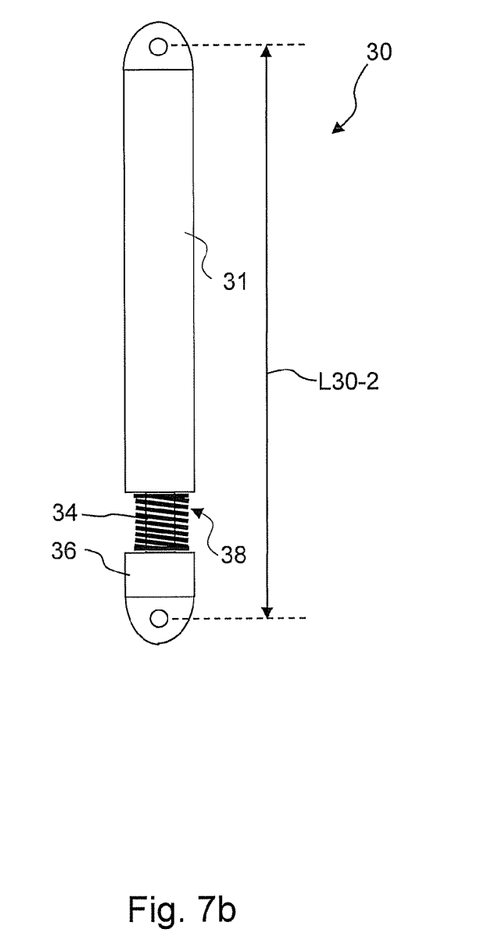

FIGS. 7a and 7b show different actuating states of the actuator 30, wherein FIG. 7a shows a relatively extended actuating state with the actuator length L30-1 and therefore a state, in which the actuator 30 is relatively unstressed by external forces, and FIG. 7b shows a relatively retracted actuating state with the actuator length L30-2 and therefore a state, in which the actuator is relatively stressed by external forces. In case the actuator 30 also features a damping device 39, the difference between L30-1 and L30-2 may increase by the respective damping travel made available by the damping device 39.

Due to the proposed inventive design of the actuator 30 with a spring mechanism 30, forces that cause a retracting movement of the cargo door L due to external effects can be compensated. In this case, the spring mechanism 38 and therefore the actuator 30 are shortened under a corresponding counterforce.

The inventive solution makes it possible, in particular, to compensate the abrupt stop of the extending movement of the cargo door L relative to the drive unit 31 when the rear edge B2 of the cargo door L comes in contact with the ground G during an extension of the cargo door that takes place when the aircraft F stands on the ground. If the actuator 30 displaces the actuating element 34 slightly beyond the position, in which this contact between the rear edge B2 of the cargo door L and the ground G takes place, the spring mechanism 38 therefore compensates this excessive extending movement against the spring force provided by this spring mechanism. Consequently, the actuator 30, as well as the fuselage structure of the aircraft F and, in particular, the respective connecting device 32, 37, is stressed less than in a solution, in which no inventive spring mechanism 38 is provided.

When cargo is unloaded from the flying aircraft while the cargo door L is extended, the cargo door L furthermore swings up once the respective cargo leaves the cargo door L. Such an upward swinging movement of the cargo door L is also compensated by means of the proposed inventive spring mechanism 38 and the stress on the actuator 30, as well as the fuselage structure of the aircraft F and, in particular, the connecting devices 32, 37, occurring during this process is reduced.

The inventive solution also compensates, in particular, effects due to a so-called "lift-back" during the extending movement of the cargo door L.

Prior to an in-flight extension of the cargo door L, the cargo door bracing device 40 or the cargo door braces 41 respectively is or are coupled into the respective coupling devices 42a, 42b that allow a predetermined maximal extension travel of the cargo door L. The guiding mechanism 2 is realized in such a way that the actuator 30 extends the cargo door L so far that the spring mechanism 38 is partially compressed against the spring force made available by this spring mechanism. According to the invention, the guiding mechanism 2 is realized in such a way that the cargo door L adjoins corresponding contact surfaces of the cargo door bracing device 40 that limit the maximal extension travel of the cargo door L with a predetermined spring force and against the spring force made available by the spring mechanism 30. In this way, the cargo door is in a stable state due to the spring force acting thereupon, as well as the bearing forces exerted by the cargo door bracing device 40, namely even if unsteady external loads occur due to the aerodynamic turbulences.

The inventive solution is also advantageous with respect to another effect attained thereby. Immediately after the extension, it may occur that the actuator experiences an activation for being once again moved back or retracted by a relatively short distance due to the supply system that supplies the actuator 30, 30a, 30b and, in particular, the design thereof and/or due to technical compensation effects during switching processes in the respective supply system. Due to the inventive guiding mechanism 2, the cargo door also continues to adjoin contact surfaces of the cargo door bracing device 40 that limit the maximum extension travel of the cargo door L with a predetermined spring force and against the spring force made available by the spring mechanism 38 after such a subsequently recurring retraction of the cargo door L if the actuator 30 previously was sufficiently far extended in accordance with its design. In this way, the cargo door L is in a stable state, namely also if unsteady external loads occur due to aerodynamic turbulences and act upon the cargo door L.

According to the invention, a method for moving a cargo door L that is pivotably supported on a fuselage R of an aircraft into extended cargo door positions A1, A2 in order to open at least one section of an opening TO of a loading hatch T and into a retracted cargo door position in order to close the section of the opening TO therefore is also proposed, wherein a first structural component in the form of the cargo door L is pivotably supported on a second structural component of the aircraft F in the form of the fuselage R by means of a pivot joint arranged in a pivoting axis D in order to assume the extended cargo door positions A1, A2, and wherein the method features the following steps:

actuating an actuating element 34 of an actuator 30; 30a, 30b that is connected to the fuselage R on the one hand and to the cargo door L on the other hand in order to move the actuating element into an actuating state that corresponds to an extended position of the cargo door L, moving the cargo door L into a limiting position due to an outer limit of the movement thereof such that it assumes a lesser extended position than the extended position of the cargo door L corresponding to the actuating state of the actuating element, wherein a spring mechanism 38 arranged between the actuating element 34 and a connecting element 36 movably coupled thereto is simultaneously compressed such that the movement of the actuating element 34 into the actuating state that lies beyond a position corresponding to the limiting position of the cargo door is compensated.

The invention claimed is:

1. A guiding mechanism for moving a cargo door into extended cargo door positions in order to open at least one section of an opening of a loading hatch on a fuselage of an aircraft and into a retracted cargo door position in order to close the at least one section of the opening of the loading hatch, wherein a first structural component in the form of the cargo door is pivotably supported on a second structural component in the form of the fuselage by a pivot joint in order to move the cargo door, the guiding mechanism comprising:

at least one actuator for moving the cargo door between the retracted position and a maximally extended cargo door position, the at least one actuator comprising:

an actuator drive unit with a first connecting device for supporting the actuator drive unit on either the first or second structural component, and an actuating element that can be moved relative to the actuator drive unit and is coupled to a second connecting device on the respectively other structural component, wherein the actuator drive unit can actuate the actuating element into adjusting states between a first actuating state that corresponds to the retracted position of the cargo door and a second actuating state that corresponds to the maximally extended position of the cargo door, a connecting element that is movably coupled to the actuator drive unit and/or the actuating element and features a supporting device for supporting the connecting element on the first or second connecting device such that a compensation travel between the actuating element and the connecting element is available at an outer limit of the extended cargo door positions relative to the respective actuating states of the actuating element; and a spring mechanism that is arranged on the at least one actuator and designed for exerting a compressive force between the first and the second connecting device and for supporting the cargo door relative to the outer limit of a respective extended cargo door position;

wherein the at least one actuator further comprises:

a second connecting element that is movable relative to the actuator drive unit and, viewed from the actuator drive unit, is situated on a side of the at least one actuator that lies opposite of a side on which the actuating element with the spring mechanism is located, and a damping device that is integrated between the second connecting element and the actuator drive unit in order to dampen movement between the second connecting element and the actuator drive unit.

2. The guiding mechanism according to claim 1, wherein the actuating element is arranged on the connecting element such that it is movable relative thereto, and wherein the spring mechanism is arranged between the connecting element and the actuating element and realized in such a way that the compensation travel at the outer limit of the extended cargo door positions is realized in the form of a movement of the connecting element relative to the actuating element, during which the spring mechanism exerts a compressive force.

3. The guiding mechanism according to claim 1, wherein the spring mechanism comprises a coil spring and/or a pneumatic spring.

4. The guiding mechanism according to claim 1, wherein the spring mechanism is realized in such a way that a spring force thereof is adjustable.

5. The guiding mechanism according to claim 1, wherein the at least one actuator comprises a hydraulic actuator.

6. The guiding mechanism according to claim 1, further comprising a cargo door bracing device with at least one cargo door brace that can be coupled to a first coupling device on the loading hatch and to a second coupling device on the cargo door, and makes available at least one maximal length of a distance between the coupling devices in order to limit a respective extended position of the loading hatch.

7. The guiding mechanism according to claim 6, wherein the cargo door bracing device is situated behind the at least one actuator viewed in a longitudinal direction of the cargo door from a pivoting axis thereof.

8. An aircraft comprising:
a fuselage;
a loading hatch;
a cargo door; and
a guiding mechanism for moving the cargo door into extended cargo door positions in order to open at least one section of an opening of the loading hatch on the fuselage of the aircraft and into a retracted cargo door position in order to close the at least one section of the opening of the loading hatch, wherein a first structural component in the form of the cargo door is pivotably supported on a second structural component in the form of the fuselage by a pivot joint in order to move the cargo door, the guiding mechanism comprising:

at least one actuator for moving the cargo door between a retracted position and a maximally extended cargo door position, the at least one actuator comprising an actuator drive unit with a first connecting device for supporting the actuator drive unit on either the first or second structural component, and an actuating element that can be moved relative to the actuator drive unit and is coupled to a second connecting device on the respectively other structural component, wherein the drive unit can actuate the actuating element into adjusting states between a first actuating state that corresponds to the retracted position of the cargo door and a second actuating state that corresponds to the maximally extended position of the cargo door, a connecting element that is movably coupled to the drive unit and/or the actuating element and features a supporting device for supporting the connecting element on the first or second connecting device such that a compensation travel between the actuating element and the connecting element is available at an outer limit of the extended cargo door positions relative to the respective actuating states of the actuating element, and a spring mechanism that is arranged on the at least one actuator and designed for exerting a compressive force between the first and the second connecting device and for supporting the cargo door relative to the outer limit of a respective extended cargo door position, wherein the at least one actuator further comprises:

a second connecting element that is movable relative to the actuator drive unit and, viewed from the actuator drive unit, is situated on a side of the at least one actuator that lies opposite of a side on which the actuating element with the spring mechanism is located, and a damping device that is integrated between the second connecting element and the actuator drive unit in order to dampen movement between the second connecting element and the actuator drive unit.

9. The aircraft according to claim 8, wherein the first connecting device is disposed on the loading hatch and the second connecting device is disposed on the cargo door.

10. The aircraft according to claim 8, wherein the guiding mechanism further comprises a cargo door bracing device with at least one cargo door brace that can be coupled to a first coupling device on the loading hatch and to a second coupling device on the cargo door, and makes available at least one maximal length of a distance between the coupling devices in order to limit a respective extended position of the cargo door.

11. A method for moving a cargo door that is pivotably supported on a fuselage of an aircraft into extended cargo door positions in order to open at least one section of an opening of a loading hatch and into a retracted cargo door position in order to close the at least one section of the opening, wherein a first structural component in the form of the cargo door is pivotably supported on a second structural component of the aircraft in the form of the fuselage by a pivot joint arranged in a pivoting axis in order to assume the extended cargo door positions, the method comprising:

actuating an actuating element of an actuator that is connected to the fuselage and to the cargo door, in order to move the actuating element into an actuating state that corresponds to an extended position of the cargo door; and moving the cargo door into a limiting position due to an outer limit of the movement thereof such that it assumes a lesser extended position than the extended position of the cargo door corresponding to the actuating state of the actuating element;

wherein a spring mechanism, arranged between the actuating element and a connecting element movably coupled thereto, is simultaneously compressed such that the movement of the actuating element into the actuating state that lies beyond a position corresponding to the limiting position of the cargo door is compensated; and wherein a second connecting element that is movable relative to an actuator drive unit and, viewed from the actuator drive unit, is situated on a side of the actuator that lies opposite of a side on which the actuating element with the spring mechanism is located, and a damping device that is integrated between the second connecting element and the actuator drive unit in order to dampen movement between the second connecting element and the actuator drive unit.

12. The method according to claim 11, wherein moving the cargo door is realized by a cargo door bracing device with at least one cargo door brace that is coupled to a first coupling device on the loading hatch and to a second coupling device on the cargo door, and makes available at least one maximal length of a distance between the coupling devices in order to limit the extended position of the cargo door.

13. The method according to claim 11, wherein the extended position of the cargo door is realized by an area of ground, on which the cargo door lies when moving the cargo door is limited.

* * * * *